United States Patent [19]
Smith

[11] 3,959,595
[45] May 25, 1976

[54] DIGITAL SIGNAL MULTIPLEXER/CONCENTRATOR

[75] Inventor: Donald Cameron Smith, Bloomington, Minn.

[73] Assignee: Sperry Rand Corporation, New York, N.Y.

[22] Filed: Jan. 9, 1975

[21] Appl. No.: 539,573

[52] U.S. Cl. .......................................... 179/15 BA
[51] Int. Cl.² ......................................... H04J 3/06
[58] Field of Search .................. 179/15 BA, 15 AF

[56] References Cited
UNITED STATES PATENTS

| | | | |
|---|---|---|---|
| 3,466,397 | 9/1969 | Benowitz et al. ............... | 179/15 BA |
| 3,809,820 | 5/1974 | Sullivan ......................... | 179/15 BA |

*Primary Examiner*—Douglas W. Olms
*Attorney, Agent, or Firm*—Kenneth T. Grace; Thomas J. Nikolai; Marshall M. Truex

[57] ABSTRACT

A synchronous time division multiplex (STDM) system for sampling 1 through N digital input data signals from their respective 1 through N input channels at their respective frequencies $F_1$ through $F_N$ for concentration and retransmission over a single output channel at a frequency $F_0 > \Sigma F_n$ is disclosed. The data bit stream of each input channel is alternately coupled to first and second similar sections, A and B, of each input-channel-associated concentrator at fixed successive sample times $T_S$. While the input data bits are coupled to and stored in the first section A during the sample time $1T_S$, the input data bits previously coupled to and stored in the second section B during the immediately previous sample time $0T_S$ are being retransmitted in their concentrated form on the output channel. On the next successive sample time $2T_S$ the input data bits are coupled to and stored in the second section B while the input data bits previously coupled to and stored in the first section A during the immediately previous sample time $1T_S$ are being retransmitted in their concentrated form on the output channel. This alternate sample, concentrate and then retransmit operation continues at successive sample times $T_S$.

7 Claims, 13 Drawing Figures

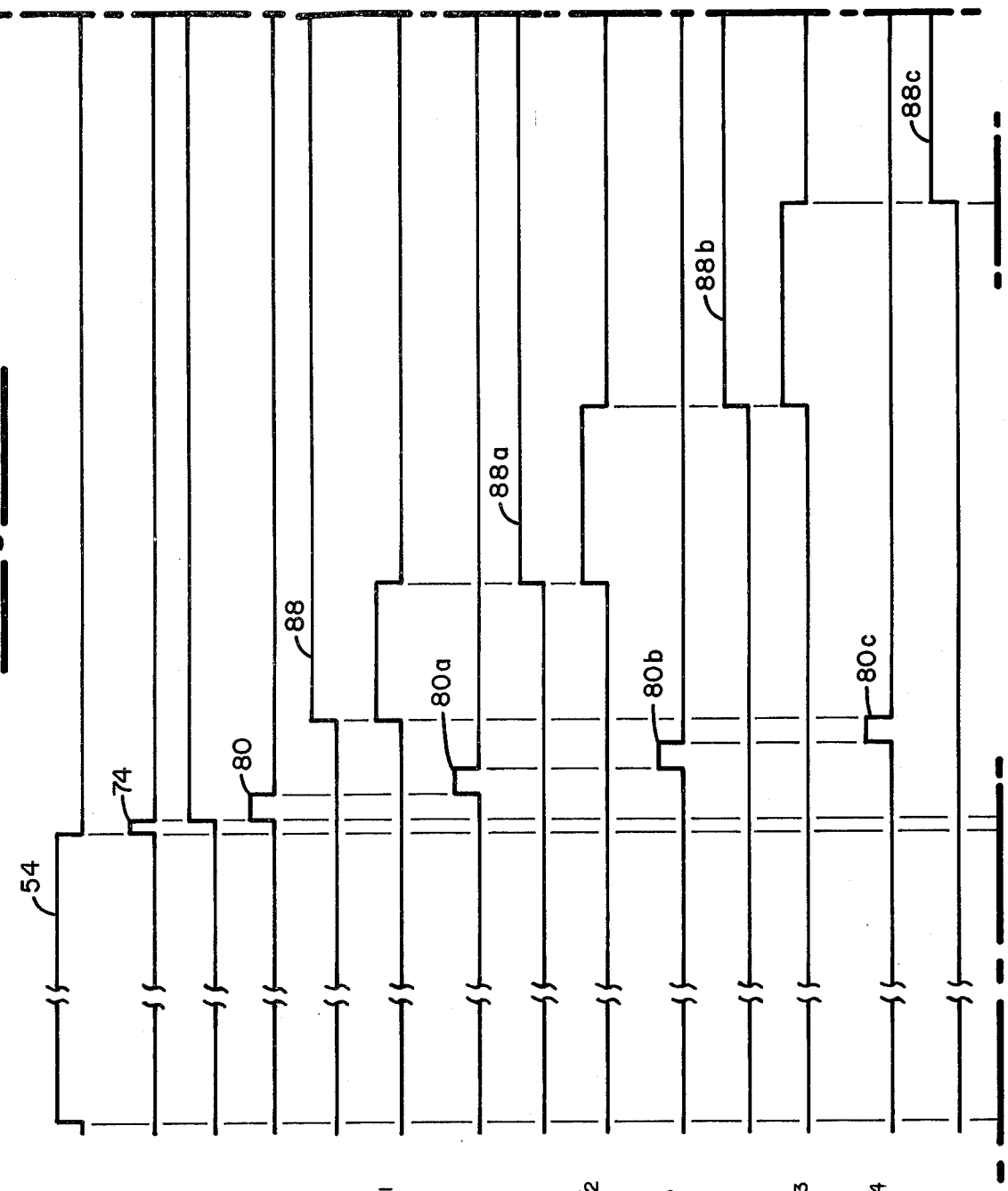

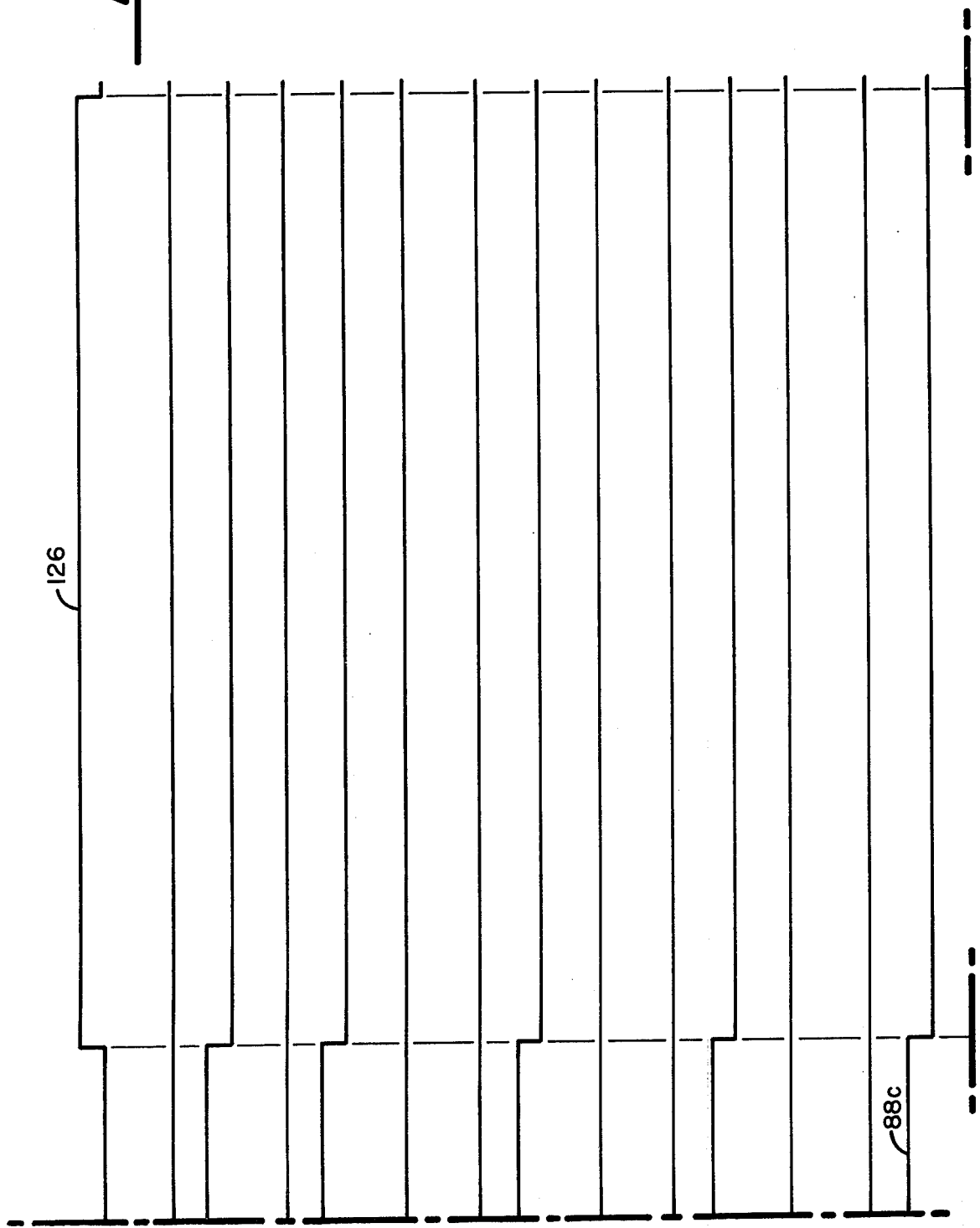

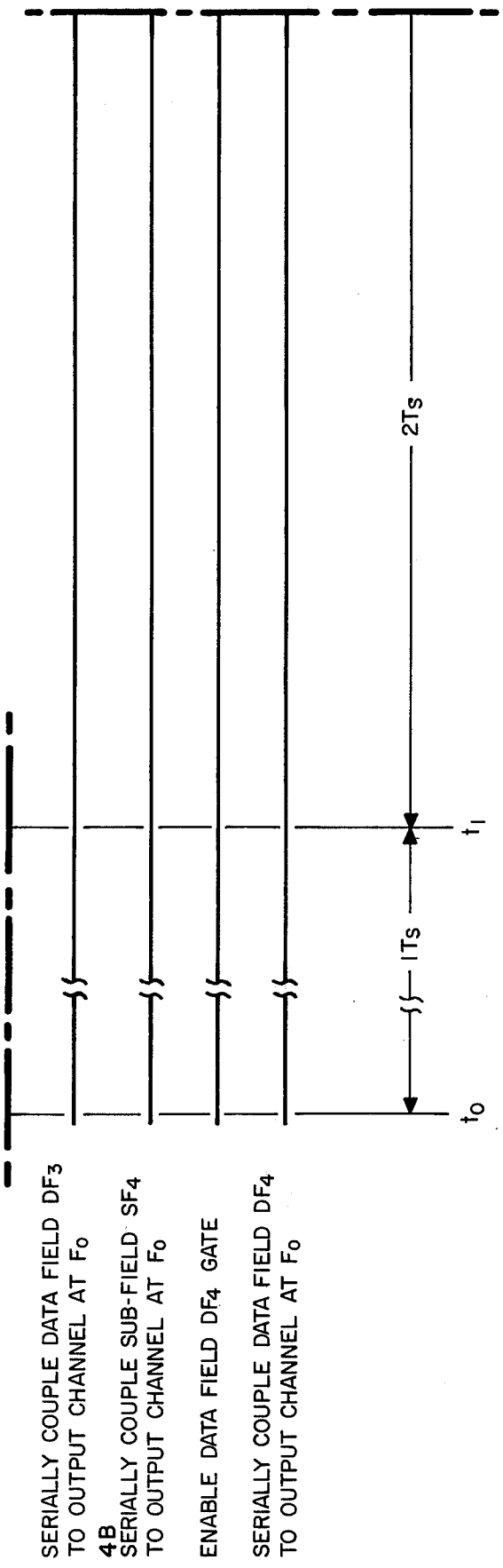

DIGITAL SIGNAL MULTIPLEXER/CONCENTRATOR

BACKGROUND OF THE INVENTION

In the prior art it is known that the more efficient use of transmission line facilities may be achieved by the sampling of a plurality of digital data streams on relatively slow speed transmission lines by a multiplexer and the retransmission of the sampled data over a single transmission line at a relatively high speed transmission line. Many coding, timing, etc., schemes have been proposed for the serialization of such sampled data for transmission of the serialized data at the transmitting site while permitting reliable demultiplexing and reconstruction of the separate sampled data at the receiving site. See the article "Multiplexing and Concentration," D. R. Doll, Proceedings of the IEEE, Vol. 60, No. 11, November, 1972, pp. 1313–1321. The present invention is directed toward a method of optimizing the multiplexing and concentration of digital data for the high speed transmission thereof using a synchronous time-division multiplexing (STDM) scheme.

SUMMARY OF THE INVENTION

The system of the present invention includes 1 through N separate input channels, each carrying input data bits at associated input frequencies $F_1$ through $F_N$, 1 through N concentrators, a separate one associated with each separate input channel, and a single output channel transmitting the output data bits at an output frequency $F_0$ where $F_0 > \Sigma F_n$. The input data bits on each input channel are coupled to separate, similar, associated concentrators, each concentrator having similar half sections A and B. All of the separate 1 through N input data signals are coupled to their separately associated 1 through N sections A over a first sample time $1T_S$ during which sample time the input data bits are counted and stored therein for forming a data field $DF_n$ from which a sub-field $SF_n$ is computed; the sub-field $SF_n$ is a binary coded number representing the difference between the actual number of received input data bits that make up the data field $DF_n$ and the minimum number of input data bits expected to be received during a typical sample time $T_S$. The minimum expected number of data bits is determined from known system characteristics, which could be zero, for each input channel. At the next successive, or second, sample time $2T_S$, the same store/count operations occur simultaneously in the 1 through N sections B; these store/count operations repeat successively in sections A, B, A, B, etc., during successive sample times $T_S$. During this next successive sample time $2T_S$ successive sub-fields $SF_n$ and successive data fields $DF_n$ stored in the 1 through N sections A during the immediately previous first sample time $1T_S$ are successively coupled to the single output channel for concentrated retransmission at an output frequency $F_0$ while the store/count operations are simultaneously occurring in the 1 through N sections B at the respective input frequencies $F_1$ through $F_N$. Thus, while an input data signal stream is being sampled in one section A at the frequency $F_n$, the sampled portion of that input data signal and its altered bit count previously stored in section B is being retransmitted from section B in a concentrated form at the frequency $F_0$ and during the next successive sample time the input data signal stream is being sampled in section B at the frequency $F_n$ and the sampled portion of the input data signal and count previously stored in section A is being retransmitted from section A in a concentrated form at the frequency $F_0$. The resulting output signal is of an output frequency $F_0$ on the single output channel and is comprised of a series of variable length words each of a length $T_T F_0$, each comprised of a series of 1 through N successive constant but not necessarily equal-length sub-fields $SF_n$ and a series of 1 through N successive variable length data fields $DF_n$, where $T_T \leq T_S$ and is a function of the actual number of input data bits received during the sample time $T_S$. $T_T$ represents the actual time that is required to retransmit one series of $T_S$ samples of N data streams $DF_n$ and associated bit counts or sub-fields $SF_n$.

DESCRIPTION OF THE PREFERRED EMBODIMENTS

Figure 1:
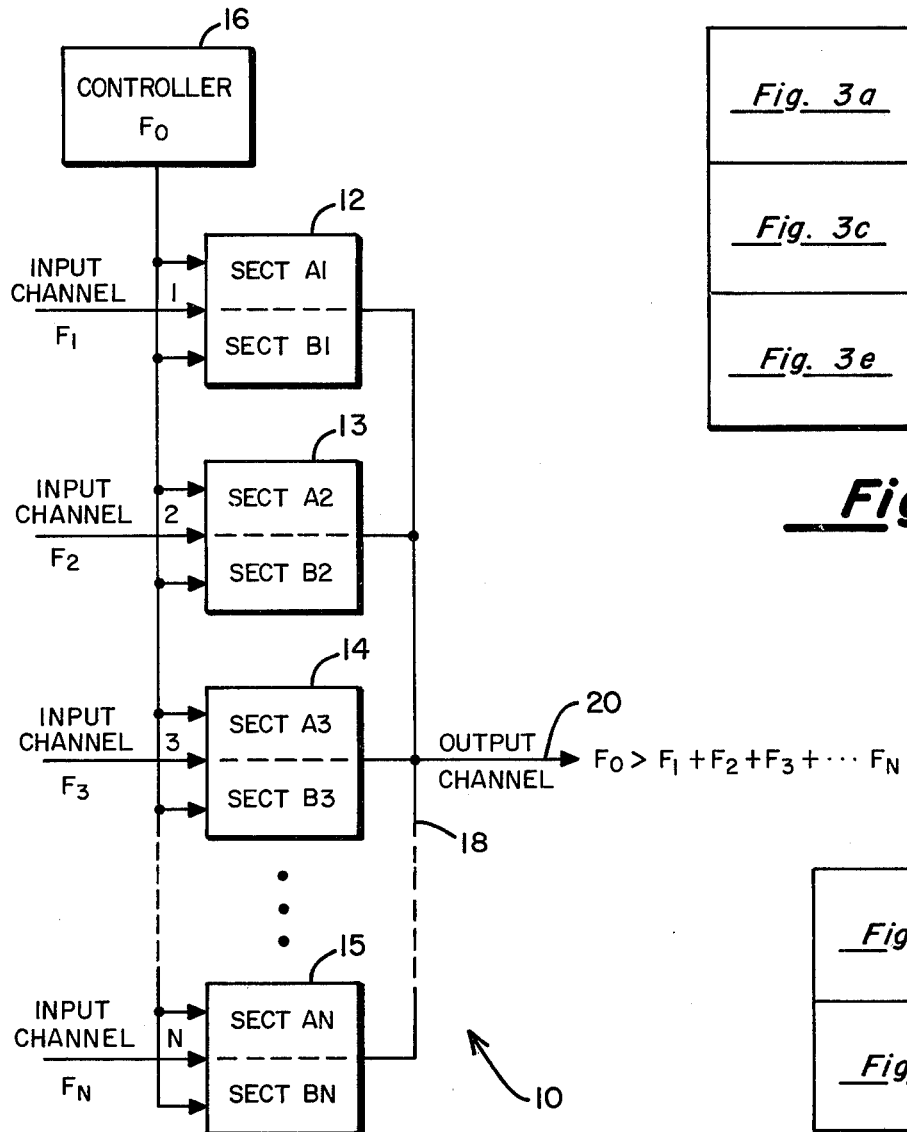
FIG. 1 is a block diagram of the digital signal multiplexer/concentrator transmission system of the present invention. Four input channels are shown for illustration only; this invention is in no way limited to any specific number of input channels.

With particular reference to FIG. 1 there is presented a block diagram of the digital signal multiplexer/concentrator transmission system of the present invention. Transmission system 10 includes N separate input channels 1 through N each receiving an input data signal at a unique input frequency $F_n$, where the frequencies $F_n$ of the input data signal streams may be different but each must have predetermined maximum and minimum rates, 1 through N concentrators 12, 13, 14, 15, a separate one associated with each separate input channel, all under control of controller 16, and a single output channel 20 for retransmitting the input data bits received and bit counts (word lengths) counted on N input channels at an output frequency $F_0$ where $F_0 > \Sigma F_n$ for $\Sigma F_n$ at any point in time. Each of the concentrators 12, 13, 14, 15 are similar to each other except for changes that may be required by the different input signal frequencies, levels, polarities, etc., associated therewith and include two similar first and second half sections A and B and steering circuitry under control of controller 16 for alternately and successively steering the received input data bit streams into sections A, B, A, B, etc., during successive sample times $T_S$.

All of the input data signals from the separate N input channels are simultaneously coupled to their separately associated concentrators over a first sample time $1T_S$. They are steered into their respectively associated first half sections A. During this first sample time $1T_S$ the input data bits are counted and stored therein for forming a data field $DF_n$ from which a sub-field $SF_n$ is computed. The subfield $SF_n$ is a binary coded number representing the difference between the actual number of received input data bits that make up the data field, $DF_n$, and the minimum number of input data bits that are expected to be received during a sample time $T_S$. At the next successive or second sample time $2T_S$, the same store/count operations occur simultaneously in all of the second half sections B of the concentrators 12, 13, 14, 15 with the store/count operations repeating successively in sections A, B, A, B, etc., during successive sample times $T_S$. During this next successive or second sample time $2T_S$ successive sub-fields, $SF_n$, and successive data fields, $DF_n$, stored in the sections A during the immediately previous first sample time, $1T_S$, are successively coupled to the single output channel for retransmission in a concentrated form at an output frequency, $F_0$, while the store/count operations are simultaneously occurring in the sections B at their respective input frequencies $F_n$. Thus, while the input data signal is being sampled in section A of a concentrator, the sampled portion of the input data signal previously stored in section B of the same concentrator is being retransmitted from section B in its concentrated form while during the next successive sample time, the input data signal is being sampled in the same section B and the sampled portion of the input data signal previously stored in section A of the same concentrator is being retransmitted from section A in its concentrated form. The resulting output signal is of an output frequency, $F_0$, on the single output channel 20 and is comprised of a series of variable length words totaling $T_T F_0$ bits, where, to reiterate, $T_T$ = the actual transmission time of any $\Sigma$ sample of N channels for one sample period, $T_S$. Each word consists of a series of N successive sub-fields $SF_n$ of lengths, $K_1$ through $K_N$, and a series of N successive data fields, $DF_n$, of lengths $T_S F_1$ through $T_S F_N$ where $T_T < T_S$ and is a function of the actual number of input data bits received during the sample time $T_S$. Note, $K_1$ through $K_N$ are constant but not necessarily equal fixed sub-field lengths based on input signal stream characteristics.

If the input data signals on the N input channels are made up of continuous input data streams of the maximum expected aggregate frequency, the data fields $DF_n$ are of a maximum aggregate length equal to $\Sigma_N{}^1 DF_n = \Sigma_N{}^1 FT_S = (F_0 T_S) - (\Sigma_N{}^1 K + T_H)$. $T_H$ represents a small, fixed time interval for internal "housekeeping" functions. It should be noted that if the sum of the aggregate input signal frequencies falls below the aggregate maximum, through either reduction of any or all of the input frequencies $F_1$ through $F_N$, or through a change by one or more of the input channel characteristics to a burst mode (On, Off, On, Off, etc.) of operation, within a single $T_S$, then $\Sigma_N{}^1 DF_n = \Sigma_N{}^1 F(T_S) < (F_0)(T_S) - (\Sigma_N{}^1 K + H)(F_0)$. It is also true that $DE_n = (F_n{}')(T_S)$ where $F_n{}'$ represents the average frequency of the input data channel over the particular sample time $T_S$ in question under all conditions. Because of variations in the number of data bits in the data fields $DF_n$, the number of bits in the sub-fields $SF_n$, which sub-fields $SF_n$ are the decremented bit counts of the actual number of data bits in the associated data fields $DF_n$ and which must be of a fixed length, i.e., a fixed number of bits for each $SF_n$ $K_1$ through $K_N$, is determined by the known minimum and maximum length of the data fields $DF_n$ in which the unused bit positions are filled with 0's. Note that the $SF_n$ bit count dedicated shall be the minimum binary word length which will contain the maximum input data word length count less the minimum input data word length count.

Figure 3:
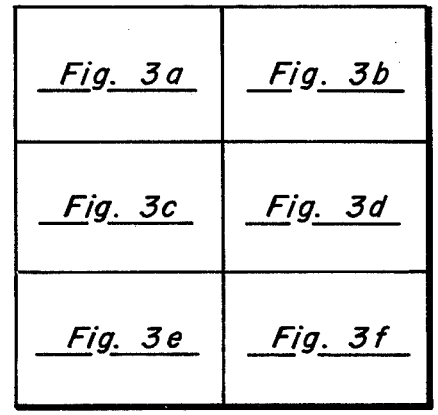
FIGS. 3a, 3b, 3c, 3d, 3e and 3f, when arranged as in FIG. 3, form an illustration of the time-channel timing relationships of the parallel store/count operations and the serial transmit operations in a 4-input channel system.
Figure 2:
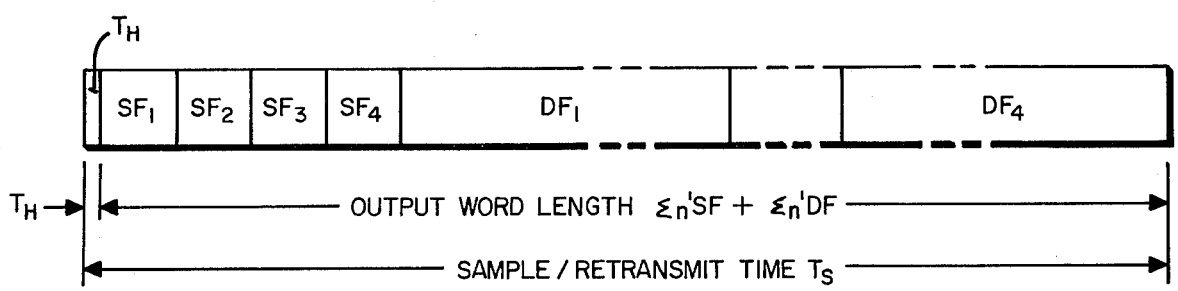
FIG. 2 is an illustration of the information format as transmitted on a single output channel of the system of FIG. 1.
Figure 3C:
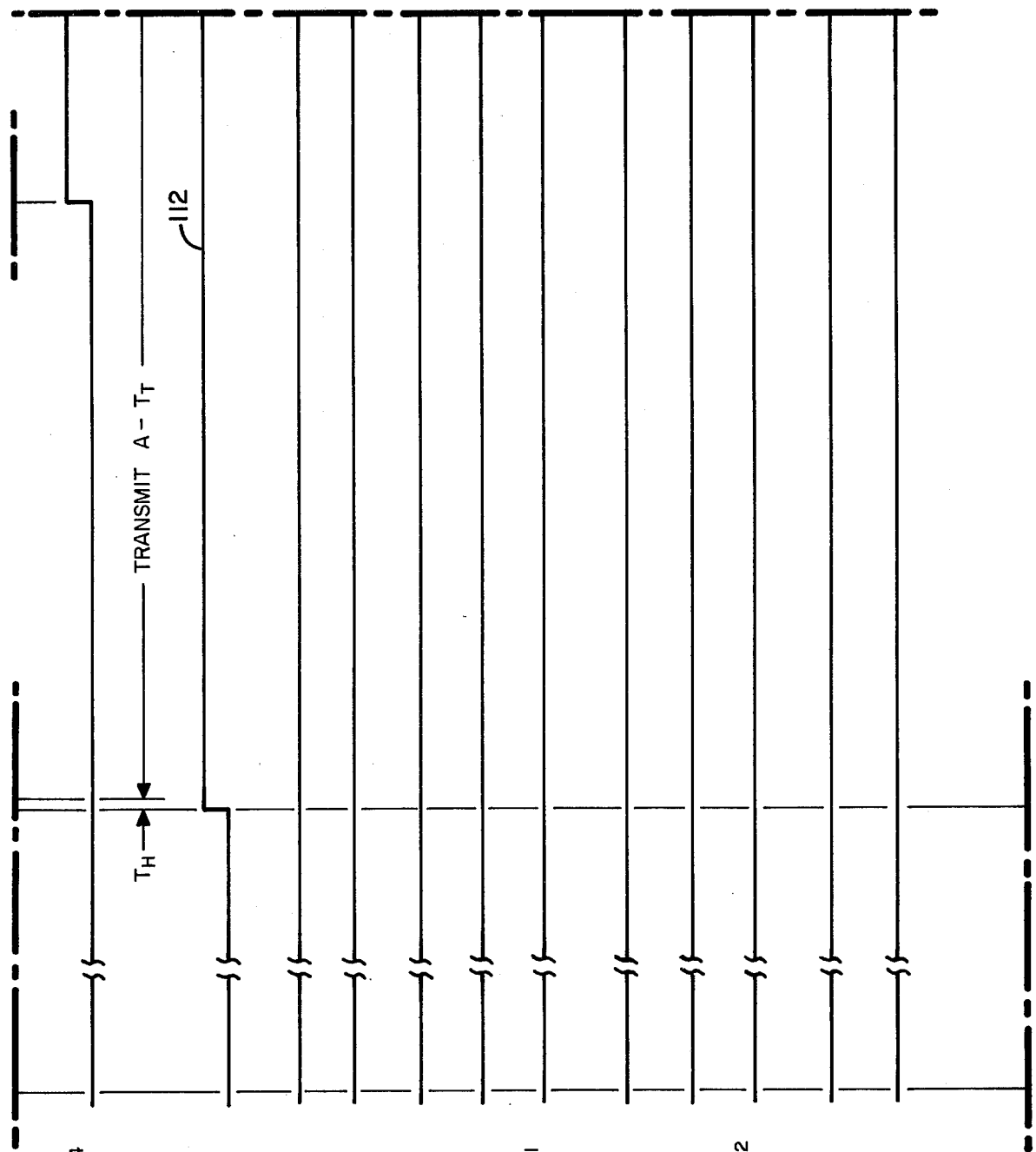
Figure 3D:
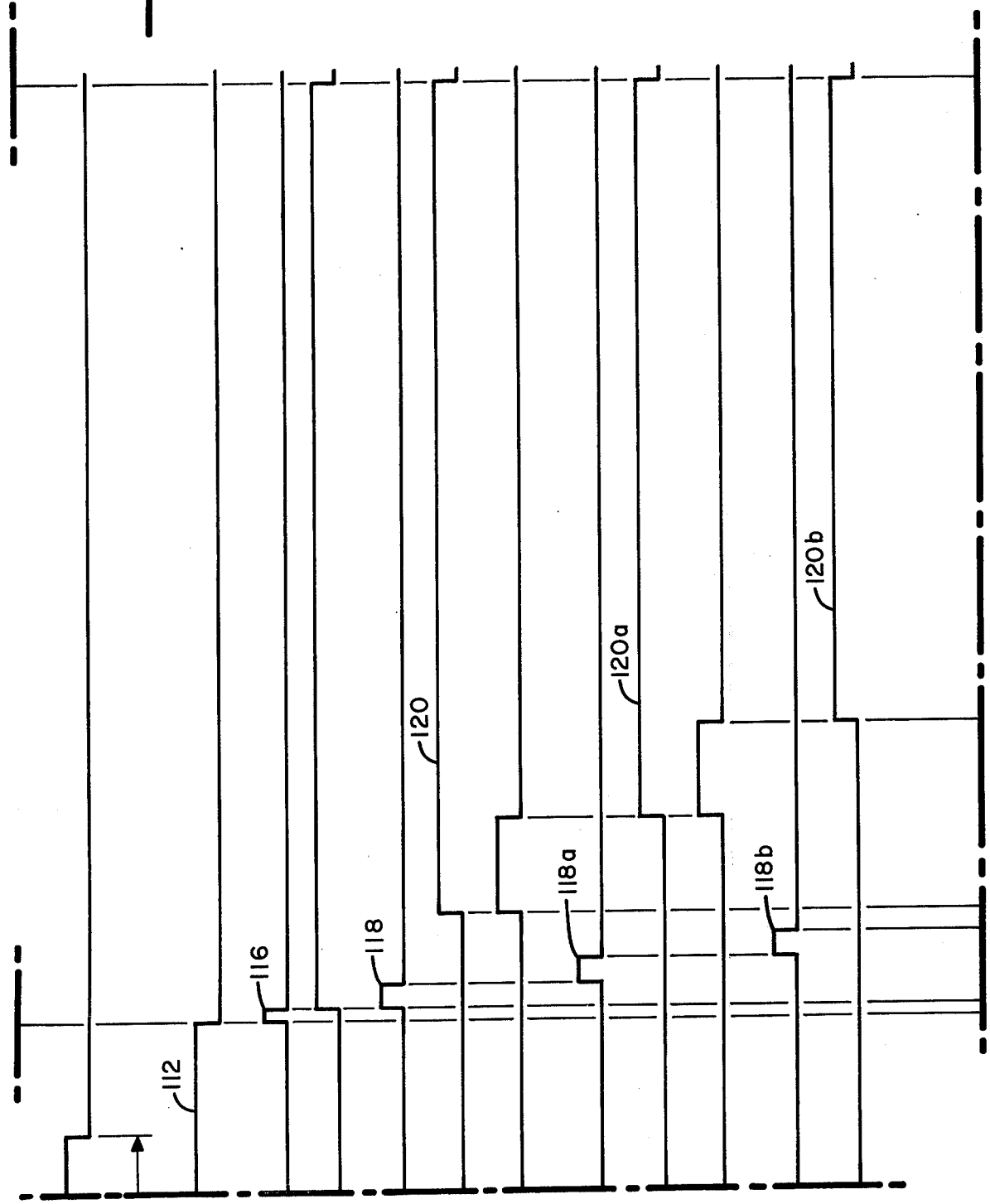
Figure 3F:
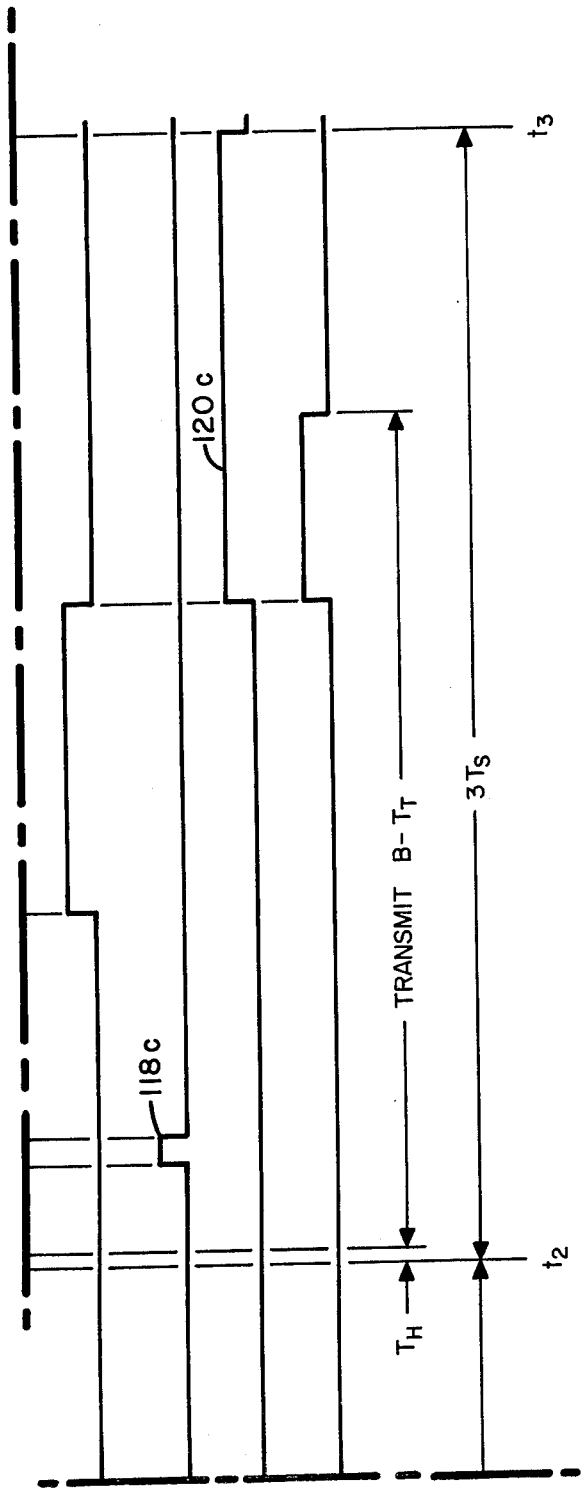
Figure 4:
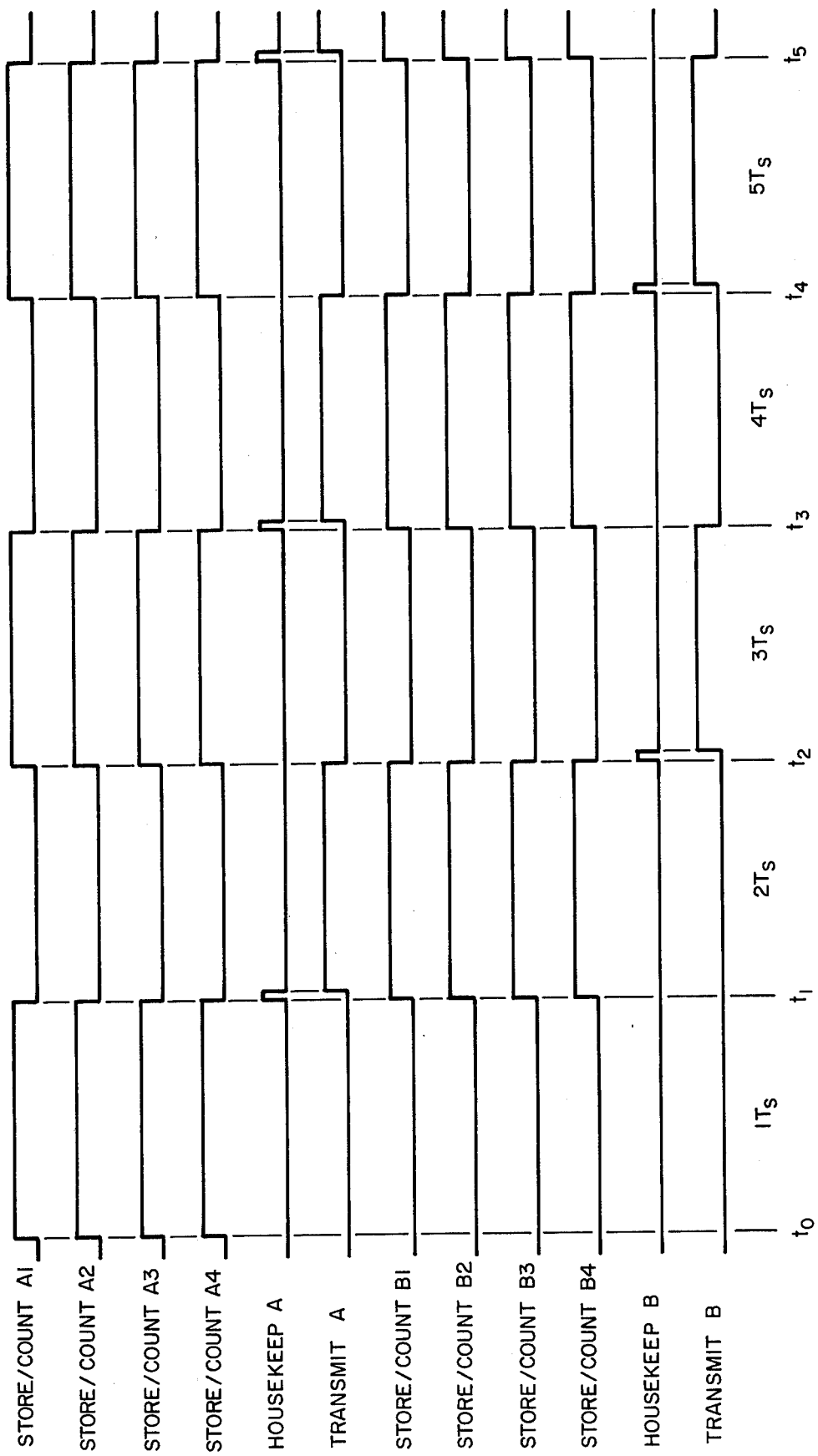
FIG. 4 is a more generalized illustration of the time-channel timing relationships of the operations of FIG. 3.
Figure 5A:
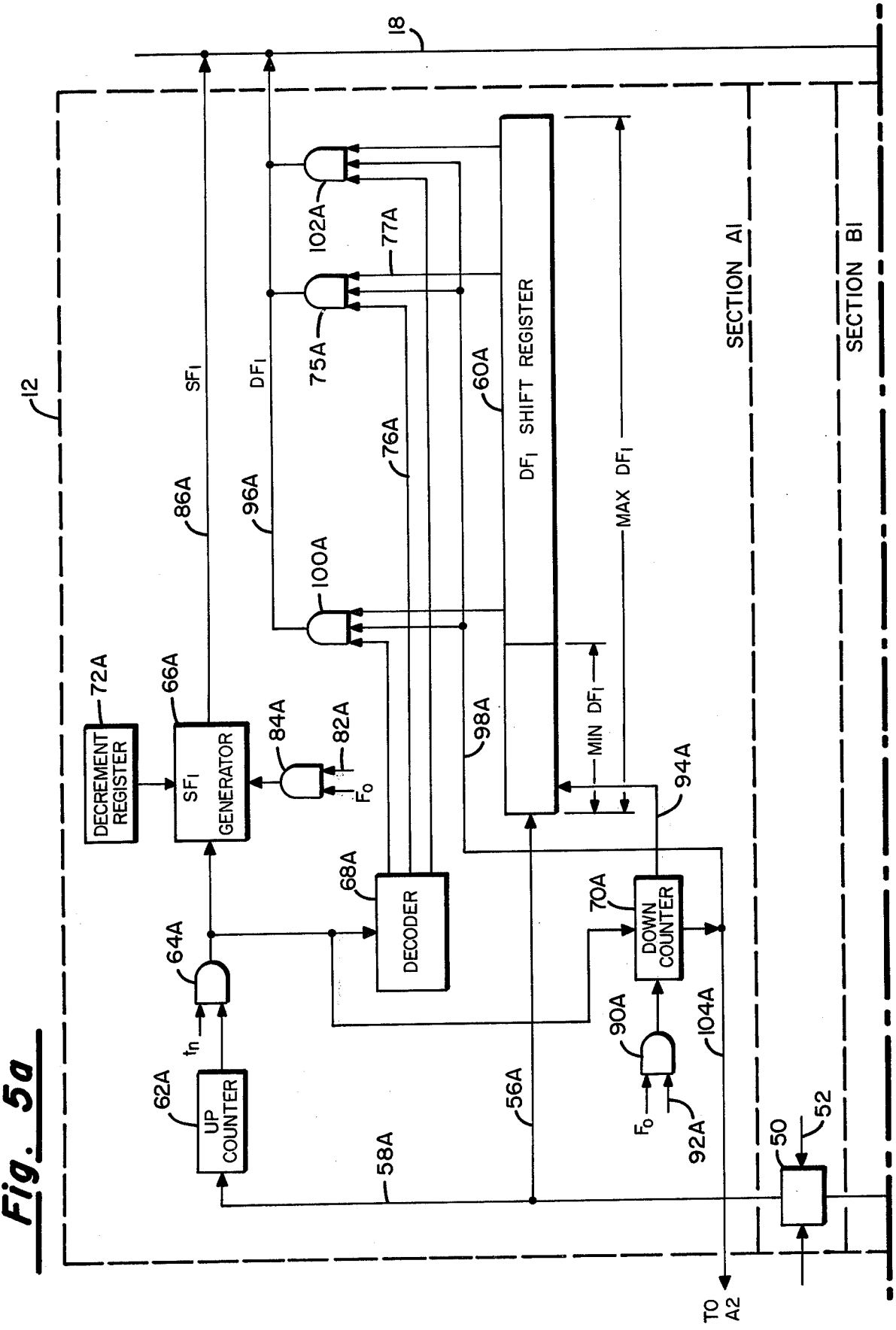
Figure 5B:
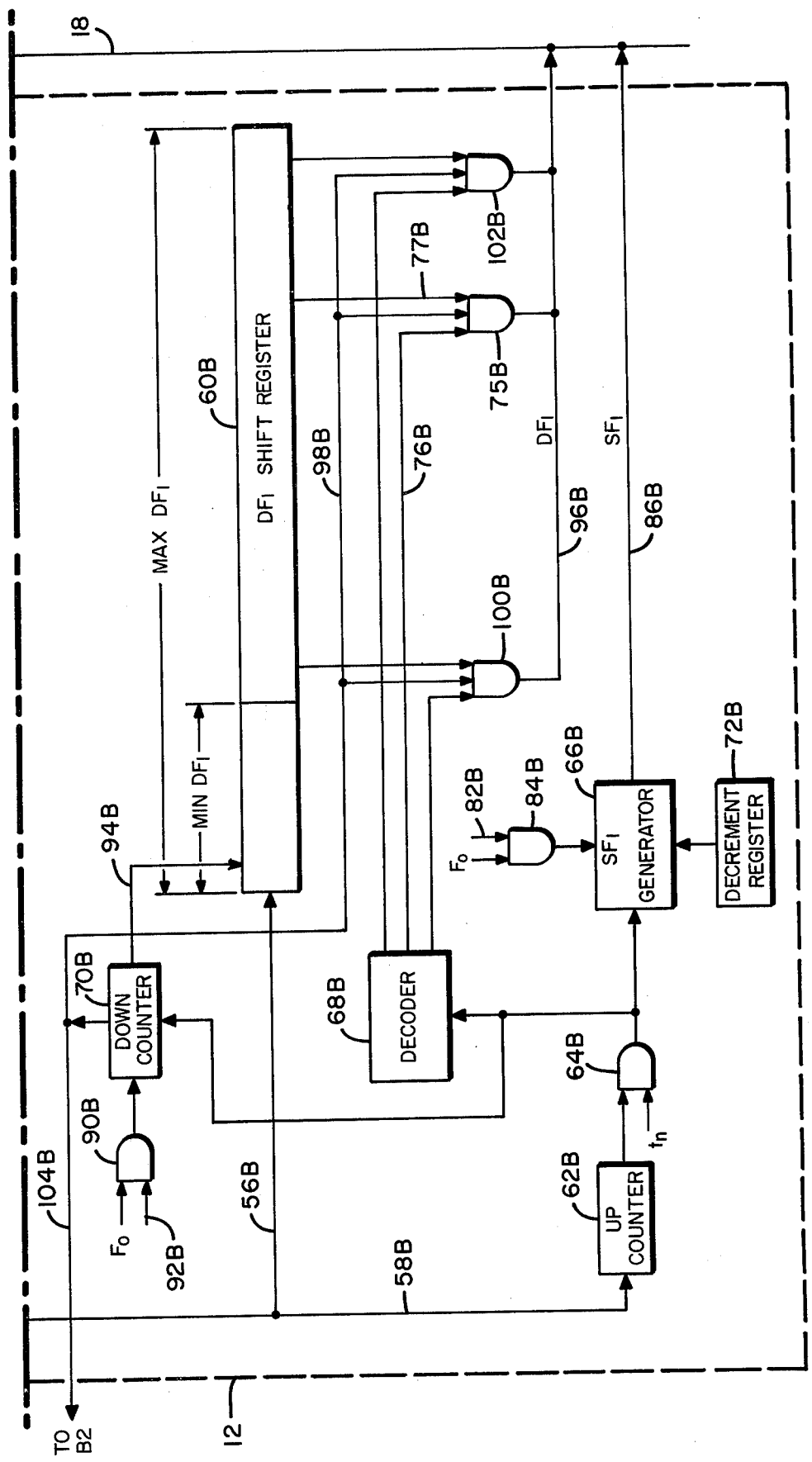

With particular reference to FIG. 2 there is presented an illustration of the output word format as assembled and transmitted on the single output channel from the time-channel relationships illustrated in FIGS. 3, 4. In this illustration of N input channels 1 through N, where N = 4, the total output word length for any one sample time $T_S$ is equal to the total of the fixed but not necessarily equal-length sub-fields $SF_n$ and the total of the variable length data fields $DF_n, \Sigma SF_n + \Sigma DF_n$ or $\Sigma_N{}^1 K_n + \Sigma_N{}^1 F_n$.

With particular reference to FIG. 4, there is presented an illustration of the broad time-channel relationships of the parallel, concurrent store/count operations and the subsequent serial transmit operation in an N = 4 input channel system of FIG. 1 over the sample times $1T_S, 2T_S \ldots 5T_S$. As stated above, the input data bits of the input data signals on each of the input channels 1, 2, 3, 4 are coupled in parallel to separate, similar, associated concentrators 12, 13, 14, 15, respectively, each concentrator having similar half sections A and B; e.g., concentrator 12 has a first half section A1 and a second half section B1. All of the separate input data signal streams are coupled to the associated concentrators 12, 13, 14, 15 and are by an internal steering gate, coupled internally to the associated sections A1, A2, A3, A4 over a first sample time $1T_S$ during which sample time the input data bits are counted and stored therein for forming a data field $DF_n$ from which a sub-field $SF_n$ is computed and stored. The computed sub-field $SF_n$ is a binary coded number representing the difference between the actual number of received input data bits that make up the data field $DF_n$ and the minimum number of input data bits expected to be received during a sample time $T_S$. This minimum number of input data bits expected to be received during any sample time $T_S$ may be of any number between 0 and a maximum number of input data bits equal to $F_{n\ (max)} T_S$ but typically might be expected to be in the order of eight-tenths that of the maximum number of input data bits.

Although the store/count operations are illustrated in FIG. 4 as extending over an entire sample time $T_S$, e.g., from time $t_0$ to $t_1$, it is to be appreciated that the input data bits as actually received, counted and stored may be received in bursts of a relatively short duration compared to the duration of the sample time $T_S$; however, the store/count operations are illustrated as being enabled over the entire sample time $T_S$ to allow for the receipt of the maximum length data field. At time $t_1$ the sample time $1T_S$ is terminated and the steering gate, over the next successive or second sample time $2T_S$ from $t_1$ to $t_2$, gates the input data bits into the associated sections B1, B2, B3, B4.

Immediately after the termination of the first sample time $1T_S$, as at time $t_1$, there is provided a short housekeeping time $T_H$ during which time the sub-field $SF_n$ is computed and the necessary decoding and enabling of the gates and circuitry of the concentrators are performed prior to retransmitting the sub-fields $SF_n$ and the data fields $DF_n$ stored in the respective sections A1, A2, A3, A4. After this short delay time $T_H$, controller 16 selectively enables the clocking signals of the transmitting frequency $F_0$ at the concentrators 12, 13, 14, 15 to successively retransmit the fixed length sub-fields $SF_1, SF_2, SF_3, SF_4$ on the single output channel 20 after which time the variable length data fields $DF_1$, $DF_2$, $DF_3$, $DF_4$, the lengths of which are specified by the respective bit counts in the respectively associated sub-fields $SF_1$, $SF_2$, $SF_3$, $SF_4$, are then coupled to the single output channel 20 in the format previously discussed with particular reference to FIG. 2. This retransmission of the data fields $DF_n$ and their respective bit count sub-fields $SF_n$ occurs as a maximum duration over the sample time $T_S$ less the housekeeping time $T_H$ as from $t_1$ to $t_2$. However, because of the selection of the transmission frequency $F_0$ being greater than the sum of the individual average frequencies over any interval $T_S$ of the input data bit streams that are received on the input channels 1, 2, 3, 4, the actual transmit time $T_T$ is always less than the sample time $T_S$.

As an example, using the values given in Table A the total actual number of data field bits transmitted is 9500 while the total number of sub-field bits is 35 providing a total of 9535 bits. At a transmission frequency of $10^6$ Baud this requires only a transmission time $T_T$ 9535 $\times$ $10^{-3}$ seconds as compared to a sample time $T_S$ of $1.0 \times 10^{-2}$ seconds, or $T_T = 0.95 I_S +$. At this point it should be noted that the aggregate maximum bit rate, $\Sigma_N^1 F_N$, exceeds the output rate $F_0$ but that the aggregate actual rate does not. In this situation a simple time division multiplexing scheme would require an output channel capacity of greater than the one specified in the example presented with particular reference to Table A.

As previously stated with respect to FIG. 4, at time $t_0$ the input data bits of the separate N input data signals on each input channel 1, 2, 3, 4 are concurrently coupled to their separately associated sections A1, A2, A3, A4 over a first sample time $1T_S$ from time $t_0$ to $t_1$ during which sample time the data bits are stored therein for forming a data field $DF_n$ and are counted for forming a bit count from which a sub-field $SF_n$ is computed and stored during the next following house-keeping time $T_H$.

$T_H$, successively coupled to the single output channel for retransmission at the output frequency $F_0$ in the manner as previously discussed with particular reference to FIGS. 2 and 3.

During the next successive sample times $T_S$, as at times $t_2$ to $t_3$, $t_3$ to $t_4$, $t_4$ to $t_5$, etc., the store/count operations occur in one section of the respective concentrator, e.g., section A1 of concentrator 12, while during a part of this period the data signals previously stored in the other half section, e.g., section B1, are transmitted out on the single output channel. Thus, while the input data signals are being sampled in the sections A1, A2, A3, A4, the sampled portions of the input data signals previously stored in the sections B1, B2, B3, B4 are being retransmitted from sections B1, B2, B3, B4 and during the next successive sample time the input data signals being sampled in sections B1, B2, B3, B4 and the sampled portions of the input data signals previously stored in sections A1, A2, A3, A4 are being retransmitted from sections A1, A2, A3, A4. The resulting output signal is of an output frequency $F_0$ on the single output channel and consists of the serial transmission of the output data words of FIG. 2 and noted as "Transmit A" during the time $t_1$ to $t_2$, "Transmit B" during time $t_2$ to $t_3$, Transmit A during time $t_3$ to $t_4$, Transmit B during time $t_4$ to $t_5$, etc.

Figure 5:
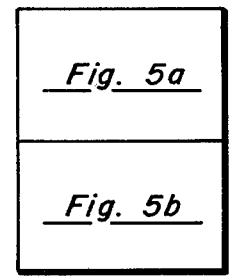
FIGS. 5a and 5b, when arranged as in FIG. 5, form a block diagram of one of the concentrators of FIG. 1.

With particular reference to FIG. 5 there is presented a block diagram of concentrator 12, the concentrators 12, 13, 14, 15 of FIG. 1 all being of substantially similar design. As stated above, concentrator 12 consists of two similar half sections A1 and B1 and a steering gate 50 which during successive sample times $T_S$ successively couples the input data bits that make up the input data signal on input channel 1 to sections A1, B1, A1, B1, etc.

Using FIG. 3 as an expanded and more detailed timing diagram of FIG. 4 and using concentrator 12 of FIG. 5 as an example of the operation of concentrators 12, 13, 14, 15, assume that no information has been

TABLE A

|  | CHANNEL | | | |
|---|---|---|---|---|
|  | 1 | 2 | 3 | 4 |
| Maximum Frequency | $10^4$ Baud | $5 \times 10^4$ Baud | $10^5$ Baud | $9 \times 10^5$ Baud |
| Present Frequency | $10^4$ Baud | $4 \times 10^4$ Baud | $10^5$ Baud | $8 \times 10^5$ Baud |
| $DF_n$ Max | $10^2$ Bits | $5 \times 10^2$ Bits | $10^3$ Bits | $9 \times 10^3$ Bits |
| $DF_n$ Min | 3 Bits | $4 \times 10^2$ Bits | $5 \times 10^2$ Bits | $5 \times 10^3$ Bits |
| $SF_n$ Fixed | 7 Bits | 7 Bits | 9 Bits | 12 Bits |
| Present $DF_n$ | $10^2$ Bits | $4 \times 10^2$ Bits | $10^3$ Bits | $8 \times 10^3$ Bits |

At the next successive or second sample time $2T_S$ the stream of data bits of the N input data signals in channels 1, 2, 3, 4 are switched from their associated section A1, A2, A3, A4 into their associated sections B1, B2, B3, B4 such that the same store/count operations that occurred in sections A1, A2, A3, A4 during the first sample time $1T_S$ from time $t_0$ to $t_1$ occur in the respectively associated sections B1, B2, B3, B4. During this second sample time the input data bits are counted and stored therein for forming a data field $DF_n$ from which a sub-field $SF_n$ is computed and stored during the next following housekeeping time $T_H$. Further, during this next successive or second sample time $2T_S$, between the time $t_1$ to $t_2$, the successive sub-fields $SF_1$, $SF_2$, $SF_3$, $SF_4$ and the successive data fields $DF_1$, $DF_2$, $DF_3$, $DF_4$ stored in the sections A1, A2, A3, A4, respectively, during the immediately previous first sample time $1T_S$ during the time $t_0$ to $t_1$, are, after the housekeeping time stored in concentrators 12, 13, 14, 15. Starting at time $t_0$, steering gate 50 is, via line 52, effected by an enable signal 54 from controller 16 which steers the received input data bits on input channel 1 into section A1 of concentrator 12. By means of data cables 56A and 58A the input data bits are then fed into shift register 60A and all data bits are counted in bit counter 62A, respectively. In shift register 60A, the data bits of the data field $DF_1$ are shifted bit serially from the left to the right over the sample time $1T_S$, the number of data bits received establishing the right-most bit position of the data bits as stored in shift register 60A.

At time $t_1$, gate 64A is enabled by controller 16. The final bit count then held in counter 62A is entered, in parallel, into sub-field generator 66A, decoder 68A and counter 70A. In sub-field generator 66A, which includes a subtractor and shift register, the final bit count is decremented by the length of the minimum input data word expected using decrement quantity register 72A. Sub-field generator 66A, from the decremented final bit count after the time represented by the housekeeping signal 74 then contains the binary coded bits that define sub-field $SF_1$. During the time represented by housekeeping signal 74, decoder 68A decodes the bit count and enables the one shift register 60A output gate 75A on the first input line 76A, the second input line 77A being coupled to the stage of shift register 60A in which the first received or rightmost data bit of the data field $DF_1$ is stored. After the completion of the decoding of the bit count by decoder 68A during housekeeping signal 74, an enable signal 80 from controller 16 is coupled to line 82A of sub-field gate 84A whereby the bits of sub-field $SF_1$ are serially coupled to line 86A and thence to the single output channel 20 via output data bus 18 at the frequency $F_0$. As indicated in FIG. 3 similar operations are successively performed in the sections A2, A3, A4 of concentrators 13, 14, 15, respectively, as indicated by the successive, fixed but not necessarily equal-length enable signals 80a, 80b, 80c from controller 16.

Upon termination of enable signal 80c, an enable signal 88 from controller 16 is coupled to data field gate 90A by means of line 92A. Gate 90A triggers counter 70A to count down from the bit count held therein triggering shift register 60A via line 94A to serially couple bits of the data field $DF_1$ to output channel 20 via line 96A and output data bus 18 at the frequency $F_0$, all data bits passing serially through the one enabled shift register output gate 75A enabled by decoder 68A. When counter 70A counts down to 0 it generates an enable signal 88a that via line 98A disables the shift register output gates 100A . . . 75A, . . . 102A. Enable signal 88a, via line 104A, is also coupled to the next successive concentrator 13. Enable signal 88a at a like positioned gate 90A in section A2 of concentrator 13 performs a similar function therein serially coupling the data field $DF_2$ onto the output data bus 18. The successive coupling of the data fields $DF_2$, $DF_3$, $DF_4$ occur in the sections A2, A3, A4 of concentrators 13, 14, 15, respectively, under control of the enabling signals 88a, 88b, 88c. Thus, at the end of the variable transmit time $T_T$ the sub-fields $SF_1$, $SF_2$, $SF_3$, $SF_4$, and data fields $DF_1$, $DF_2$, $DF_3$, $DF_4$ have been serially coupled to the single output channel 20 at an output frequency $F_0$ in the information format as previously discussed with particular reference to FIG. 2.

Starting at time $t_1$, steering gate 50 is, via line 52, effected by an enable signal 112 from controller 16 which steers the received input data bits on input channel 1 into section B1 of concentrator 12. By means of data cables 56B and 58B the input data bits are then fed into shift register 60B and all data bits are counted in bit counter 62B, respectively. In shift register 60B, the data bits of the data field $DF_1$ are shifted bit serially from the left to the right over the sample time $2T_S$, the number of data bits received establishing the right-most bit position of the data bits as stored in shift register 60B.

At time $t_2$, gate 64B is enabled by controller 16. The final bit count then held in counter 62B is entered, in parallel, into sub-field generator 66B, decoder 68B and counter 70B. In sub-field generator 66B the final bit count is decremented by the length of the minimum input data word expected using decrement quantity register 72B. Sub-field generator 66B, from the decremented final bit count after the time represented by the housekeeping signal 116 then contains the binary coded bits that define sub-field $SF_1$. During the time represented by housekeeping signal 116, decoder 68B decodes the bit count and enables the one shift register 60B output gate 75B on the first input line 76B, the second input line 77B being coupled to the stage of shift register 60B in which the first received or rightmost data bit of the data field $DF_1$ is stored. After the completion of the decoding of the bit count by decoder 68B during housekeeping signal 116, an enable signal 118 from controller 16 is coupled to line 82B of sub-field gate 84B whereby the bits of sub-field $SF_1$ are serially coupled to line 86B and thence to the single output channel 20 via output data bus 18 at the frequency $F_0$. As indicated in FIG. 3 similar operations are successively performed in the sections B2, B3, B4 of concentrators 13, 14, 15, respectively, as indicated by the successive, constant but not necessarily equal-length enable signals 118a, 118b, 118c from controller 16.

Upon the termination of enable signal 118c, an enable signal 120 from controller 16 is coupled to data field gate 90B by means of line 92B. Gate 90B triggers counter 70B to count down from the bit count held therein triggering shift register 60B, via line 94B, to serially couple bits of the data field $DF_1$ to output channel 20 via line 96B and output data bus 18 at the frequency $F_0$, all data bits passing serially through the one enabled shift register output gate 75B enabled by decoder 68B. When counter 70B counts down to 0 it generates an enable signal 120a that via line 98B disables the shift register output gates 100B . . . 75B, . . . 102B. Enable signal 120a, via line 104B, is also coupled to the next successive concentrator 13. Enable signal 120a at a like positioned gate 90B in section A2 of concentrator 13 performs a similar function therein serially coupling the data field $DF_2$ onto the output data bus 18. The successive coupling of the data fields $DF_2$, $DF_3$, $DF_4$ occur in the sections B2, B3, B4 of concentrators 13, 14, 15, respectively, under control of the enabling signals 120a, 120b, 120c. Thus, at the end of the variable transmit time $T_T$ the sub-fields $SF_1$, $SF_2$, $SF_3$, $SF_4$, and data fields $DF_1$, $DF_2$, $DF_3$, $DF_4$ have been serially coupled to the single output channel 20 at an output frequency $F_0$ in the information format as previously discussed with particular reference to FIG. 2.

Starting at time $t_2$, steering gate 50 is, via line 52, effected by an enable signal 126 from controller 16 which steers the received input data bits on input channel 1 into section A1 of concentrator 12. By means of data cables 56A and 58A the input data bits are then fed into shift register 60A and all data bits are counted in bit counter 62A, respectively. In shift register 60A, the data bits of the data field $DF_1$ are shifted bit serially from the left to the right over the sample time $3T_S$, the number of data bits received establishing the right-most bit position of the data bits as stored in shift register 60A.

These parallel store/count A, transmit B and store/count B, transmit A operations continue in the manner as more generally described with particular reference to FIG. 4.

What is claimed is:

1. A digital signal concentrator coupling an input channel, said input channel transmitting data bits at a frequency $F_n$, to an output channel, said output channel transmitting data bits at a predetermined frequency $F_0$, where $F_0 > F_n$, comprising:

first and second similar sections A and B;

steering means coupled to said input channel for alternatively steering the data bits carried by said input channel at a frequency $F_n$ to either section A or B over a fixed sample time $T_S$;

each of said first and second similar sections A and B comprising:

$DF_n$ storage means responsively coupled to said steering means and of a sufficient capacity to store at least the maximum number of data bits that is expected to be received from said input channel over said fixed sample time $T_S$;

first counter means responsively coupled to said steering means and counting the actual number of data bits that is received from said input channel over said fixed sample time $T_S$ for generating an actual bit count thereof;

$SF_n$ generator means;

decrementing means coupled to said $SF_n$ generator means for coupling thereto a minimum bit count that is representative of the minimum number of data bits that is expected to be received from said input channel over said fixed sample time $T_S$;

said $SF_n$ generator means receiving said minimum bit count from said decrementing means and said actual bit count from said first counter means for generating a sub-field $SF_n$ that is an encoded representation of said actual bit count less said minimum bit count and coupling the bits of said sub-field $SF_n$ held in said $SF_n$ generator means to said output channel at said output frequency $F_0$;

switching means responsively coupled to said first counter means and said $DF_n$ storage means for coupling the data bits of said data field $DF_n$ held in said $DF_n$ storage means to said output channel at said output frequency $F_0$.

2. A digital signal concentrator coupling an input channel, said input channel carrying data bits at a predetermined frequency $F_n$, to an output channel, said output channel carrying data bits at a predetermined frequency $F_0$, where $F_0 > F_n$, comprising:

first and second similar sections A and B;

steering means coupled to said input channel for alternatively steering the data bits carried by said input channel at a frequency $F_n$ to either section A or B over a fixed sample time $T_S$;

each of said first and second similar sections A and B comprising:

$DF_n$ storage means of a sufficient capacity to store at least the maximum number of data bits that is expected to be received from said input channel over said sample time $T_S$;

first counter means counting the actual number of data bits that is received from said input channel for generating an actual bit count thereof;

$SF_n$ generator means;

decrementing means coupled to said $SF_n$ generator means for coupling thereto a minimum bit count that is representative of the minimum number of data bits that is expected to be received from said input channel over said fixed sample time $T_S$;

decoder means;

second counter means coupled to said $DF_n$ storage means;

first counter gating means coupled to said first counter means for coupling said actual bit count to said $SF_n$ generator means, said decoder means and said second counter means;

said $SF_n$ generator means receiving said minimum bit count from said decrementing means and said actual bit count from said first counter means for generating a sub-field $SF_n$ that is a binary coded representation of said actual bit count less said minimum bit count;

$SF_n$ gating means for coupling the bits of said sub-field $SF_n$ held in said $SF_n$ generator means to said output channel at said output frequency $F_0$;

switching means responsively coupled to said decoder means and said $DF_n$ storage means for coupling the data bits of said data field $DF_n$ held in said $DF_n$ storage means to said output channel;

$DF_n$ gating means coupled to said down counter means and triggering said $DF_n$ storage means at said outpt frequency $F_0$ for coupling the data bits of said data field $DF_n$ to said switching means and thence to said output channel at said output frequency $F_0$.

3. A digital signal concentrator coupling an input channel, said input channel carrying data bits at a predetermined frequency $F_n$, to an output channel, said output channel carrying data bits at a predetermined frequency $F_0$, where $F_0 > F_n$, comprising:

first and second similar sections A and B;

steering means coupled to said input channel for alternatively steering the data bits carried by said input channel at a frequency $F_n$ to either section A or B over a fixed sample time $T_S$;

each of said first and second similar sections A and B comprising:

$DF_n$ shift register means of a length equal to at least the maximum number of data bits that is expected to be received from said input channel over said sample time $T_S$;

an up counter means counting the actual number of data bits that is received from said input channel for generating an actual bit count thereof;

$SF_n$ generator means;

decrement quantity means coupled to said $SF_n$ generator means for coupling thereto a minimum bit count that is representative of the minimum number of data bits that is expected to be received from said input channel over said fixed sample time $T_S$;

decoder means;

down counter means coupled to said $DF_n$ shift register means;

up counter gating means coupled to said up counter means for coupling said actual bit count to said $SF_n$ generator means, said decoder means and said down counter means;

said $SF_n$ generator means receiving said minimum bit count from said decrement quantity means and said actual bit count from said up counter means for generating a sub-field $SF_n$ that is a binary coded representation of the actual bit count less the minimum bit count;

$SF_n$ generator means gating means for coupling the bits of said sub-field $SF_n$ held in said $SF_n$ generator means to said output channel at said output frequency $F_0$;

switching means responsively coupled to said decoder means and said $DF_n$ generator means for coupling the data bits of said data field $DF_n$ held in said $DF_n$ generator means to said output channel at said output frequency $F_0$;

down counter gating means coupled to said down counter means for triggering said $DF_n$ generator means at said output frequency $F_0$ to couple the data bits of said data field $DF_n$ to said switching means at said output frequency $F_0$.

4. A digital signal multiplexer/concentrator, comprising: an output channel;
N input channels, each of said N input channels carrying data bits at an input frequency $F_n$, where the frequency $F_n$ of the data bits carried by each of said N input channels may be different but must be predetermined;
N concentrators, each separate one of said N concentrators alternatively coupling the data bits carried by each separate associated one of said N input channels to said output channel at an output frequency of $F_0$, each of said N concentrators comprising:
first and second similar sections A and B;
steering means coupled to the associated one of said input channels for alternatively steering the data bits of the data field $DF_n$ carried by the associated one of said input channels at said input frequency $F_n$ to either section A or B over a predetermined fixed sample time $T_S$;
each of said first and second sections A and B comprising:
storage means, coupled to said steering means, of a capacity equal to at least the maximum number of data bits of the data field $DF_n$ that is expected to be received from said associated one of said input channels over said fixed sample time $T_S$ for storing said data field $DF_n$;
generator means coupled to said steering means for counting the actual number of data bits of the data field $DF_n$ as received from said associated one of said input channels over said fixed sample time $T_S$ and generating a sub-field $SF_n$ that is a coded representation of said actual number of data bits of the data field $DF_n$ less the minimum number of data bits that is expected to be received from said associated one of said input channels over said fixed sample time $T_S$;
said N concentrators simultaneously storing in parallel in the storage means of their sections A at their respective input frequency $F_n$ the data bits carried in each of the associated input channels during a first sample time $1T_S$ while simultaneously during said first sample time $1T_S$ successively coupling to said output channel at said output frequency $F_0$ the N sub-fields $SF_n$ and then the N data fields $DF_n$ from their sections B, and then simultaneously storing in parallel in the storage means of their sections B at their respective input frequency $F_n$ the data bits carried in each of the associated input channels during a next successive second sample time $2T_S$ while simultaneously during said second sample time $2T_S$ successively coupling to said output channel at said output freqency $F_0$ the N sub-fields $SF_n$ and then the N data fields $DF_n$ from their sections A.

5. A digital signal multiplexer/concentrator, comprising:
a single output channel for transmitting data bits at an output frequency $F_0$;
N separate input channels, each of said N input channels carrying data bits at a frequency $F_n$ where the frequency $F_n$ of the data bits carried by each of said N input channels may be different but must not exceed a predetermined maximum frequency;
N concentrators, each separate one of said N concentrators coupled to a separate associated one of said N input channels for coupling seriatim the data bits carried by each of said N input channels to said output channel at said output frequency $F_0$, where $F_0 > \Sigma F_n$, each of said N concentrators comprising:
first and second similar sections A and B;
steering means coupled to the associated one of said input channels for alternatively steering the data bits carried by said associated one of said input channels at a frequency $F_n$ to either section A or B over a fixed sample time $T_S$;
each of said first and second similar sections A and B comprising:
$DF_n$ storage means responsively coupled to said steering means for receiving said data bits and of a capacity equal to at least the maximum number of data bits that is expected to be received from said associated one of said N input channels over said fixed sample time $T_S$;
first counter means responsively coupled to said steering means and counting the actual number of data bits that is received from said associated one of said N input channels over said fixed sample time for generating an actual bit count thereof;
$SF_n$ generator means;
decrementing means coupled to said $SF_n$ generator means for coupling thereto a minimum bit count that is representative of the minimum number of data bits that is expected to be received from said associated one of said N input channels over said fixed sample time $T_S$;
said $SF_n$ generator means receiving said minimum bit count from said decrementing means and said actual bit count from said first counter means for generating a sub-field $SF_n$ that is an encoded representation of said actual bit count less said minimum bit count and coupling the bits of said sub-field $SF_n$ to said single output channel at said output frequency $F_0$;
$DF_n$ switching means responsively coupled to said first counter means and said $DF_n$ storage means for coupling the data bits of said data field $DF_n$ held in said $DF_n$ storage means to said single output channel at said output frequency $F_0$;
means responsively coupled to said first counter means and generating an enabling signal for enabling the $DF_n$ switching means of the next subsequent transmitting one of said N concentrators when the last bit of said data field $DF_n$ held in said $DF_n$ storage means has been coupled to said single output channel at said output frequency $F_0$.

6. A digital signal multiplexer/concentrator, comprising:
a single output channel for carrying data bits at an output frequency $F_0$;
N separate input channels, each of said N input channels carrying data bits at a frequency $F_n$ where the frequency $F_n$ of the data bits carried by each of said N input channels may be different but must not exceed a predetermined maximum frequency;

N concentrators, each separate one of said N concentrators coupling a separate associated one of said N input channels to said output channel, each of said N concentrators comprising:

first and second similar sections A and B;

steering means coupled to the associated one of said input channels for alternatively steering the data bits carried by said associated one of said input channels at a frequency $F_n$ to either section A or B over a fixed sample time $T_S$;

each of said first and second similar sections A and B comprising:

shift register means of a length equal to at least the maximum number of data bits that is expected to be received from said associated one of said N input channels over said sample time $T_S$;

an up counter means counting the actual number of data bits that is received from said associated one of said N input channels for generating an actual bit count thereof;

generator means;

decrement means coupled to said generator means for coupling thereto a minimum bit count that is representative of the minimum number of data bits that is expected to be received from said associated one of said N input channels over said fixed sample time $T_S$;

decoder means;

down counter means coupled to said shift register means bit count gating means coupled to said up counter means for coupling said actual bit count to said generator means, said decoder means and said down counter means;

said generator means receiving said minimum bit count from said decrement means and said actual bit count from said up counter means for generating a sub-field $SF_n$ that is a coded representation of said actual bit count less said minimum bit count;

generator gating means for coupling the bits of said sub-field $SF_n$ to said output channel at said output frequency $F_0$;

switching means responsively coupled to said decoder means and said shift register means for coupling th data bits of said data field $DF_n$ held in said shift register means to said output channel at said output frequency $F_0$;

down counter gating means coupled to said down counter means and triggering said shift register means at said output frequency $F_0$ for coupling the data bits of said data field $DF_n$ to said switching means and thence to said output channel at said output frequency $F_0$;

said down counter means generating a down counter gating means enabling signal when said actual bit count has been counted down to 0 for enabling the down counter gating means of the next subsequent transmitting one of said N concentrators to couple the data bits of its data field $DF_n$ to its associated switching means and thence to said output channel at said output frequency $F_0$.

7. A digital signal multiplexer/concentrator, comprising:

a single output channel for carrying data bits at an output frequency $F_0$;

N separate input channels, each of said N input channels carrying data bits at a frequency $F_n$, where the frequency $F_n$ of the data bits carried by each of said N input channels may be different but must not exceed a predetermined maximum frequency;

N concentrators, each separate one of said N concentrators coupled to a separate associated one of said N input channels for coupling seriatim the data bits carried by each of said N input channels to said output channel at said output frequency $F_0$, where $F_0 > \Sigma F_n$, each of said N concentrators comprising:

first and second similar sections A and B;

steering means coupled to the associated one of said input channels for alternatively steering the data bits carried by said associated one of said input channels at a frequency $F_n$ to either section A or B over a fixed sample time $T_S$;

each of said first and second similar sections A and B comprising:

$DF_n$ shift register means of a length equal to at least the maximum number of data bits that is expected to be received from said associated one of said N input channels over said sample time $T_S$;

an up counter means counting the actual number of data bits that is received from said associated one of said N input channels for generating an actual bit count thereof;

$SF_n$ generator means;

decrement quantity means coupled to said $SF_n$ generator means for coupling thereto a minimum bit count that is representative of the minimum number of data bits that is expected to be received from said associated one of said N input channels over said fixed sample time $T_S$;

decoder means;

down counter means coupled to $DF_n$ shift register means;

bit count gating means coupled to said up counter means for coupling said actual bit count to said $SF_n$ generator means, said decoder means and said down counter means;

said $SF_n$ generator means receiving said minimum bit count from said decrement quantity means and said actual bit count from said counter means for generating a sub-field $SF_n$ that is a binary coded representation of said actual bit count less said minimum bit count;

$SF_n$ generator gating means for coupling the bits of said sub-field $SF_n$ to said single output channel at said output frequency $F_0$;

switching means responsively coupled to said decoder means and said $DF_n$ generator means for coupling the data bits of said data field $DF_n$ held in said $DF_n$ generator means to said single output channel at said output frequency $F_0$;

down counter gating means coupled to said down counter means and triggering said $DF_n$ generator means at said output frequency $F_0$ for coupling the data bits of said data field $DF_n$ to said switching means and thence to said single output channel at said output frequency $F_0$;

said down counter means generating a down counter gating means enabling signal when said actual bit count has been counted down to 0 for enabling the down counter gating means of the next subsequent transmitting one of said N concentrators.

* * * * *

UNITED STATES PATENT AND TRADEMARK OFFICE
CERTIFICATE OF CORRECTION

PATENT NO. : 3,959,595
DATED : May 25, 1976
INVENTOR(S) : Donald Cameron Smith

It is certified that error appears in the above–identified patent and that said Letters Patent are hereby corrected as shown below:

Column 10, Line 16, "outpt" should be --output--.

Column 11, Line 7, "ing: an output channel;" should be --ing:

an output channel;-- to indicate a separate paragraph.

Column 13, Line 47, "th" should be --the--.

Signed and Sealed this

Tenth Day of August 1976

[SEAL]

Attest:

RUTH C. MASON
Attesting Officer

C. MARSHALL DANN
Commissioner of Patents and Trademarks